Patented Feb. 11, 1936

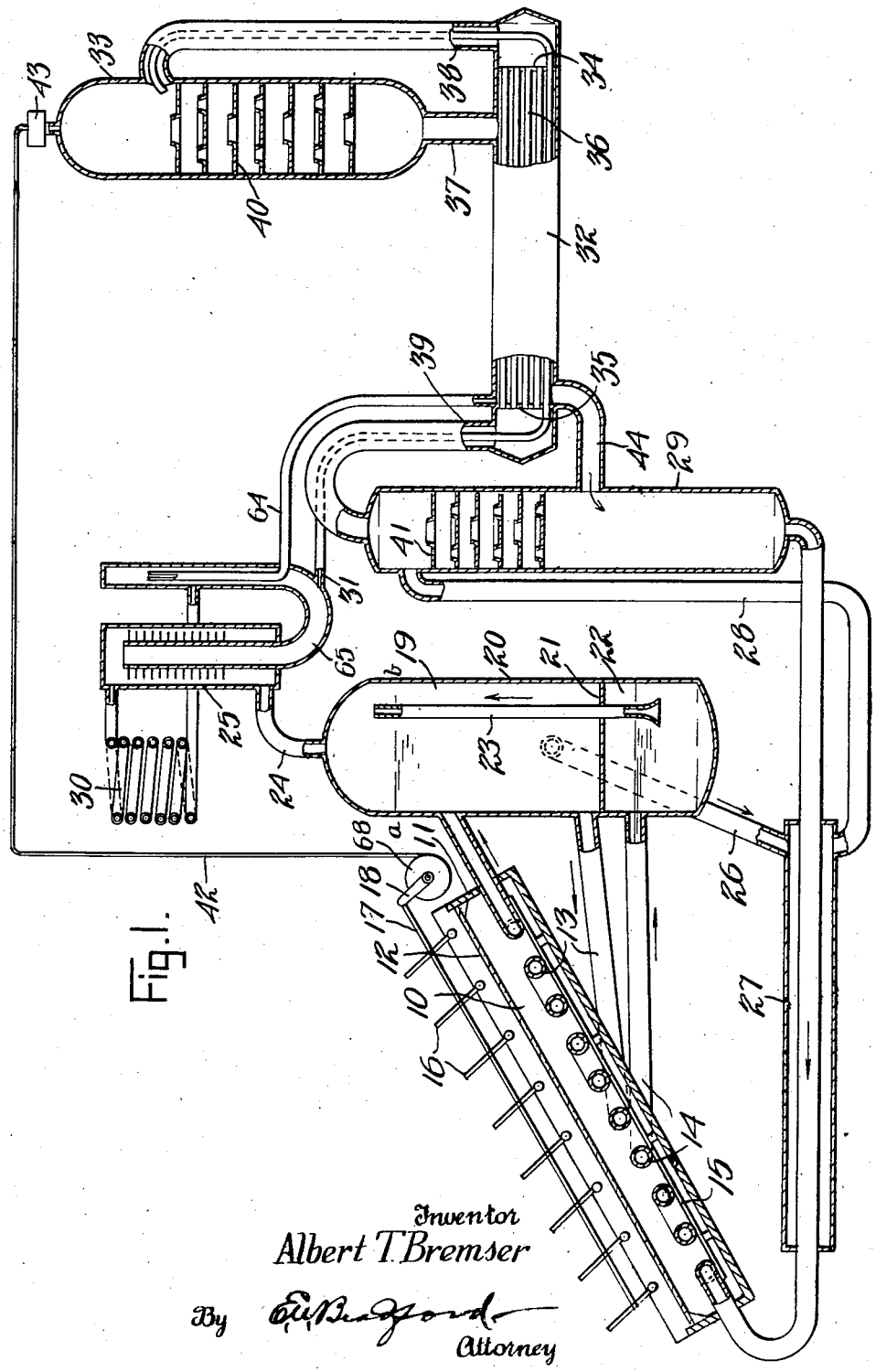

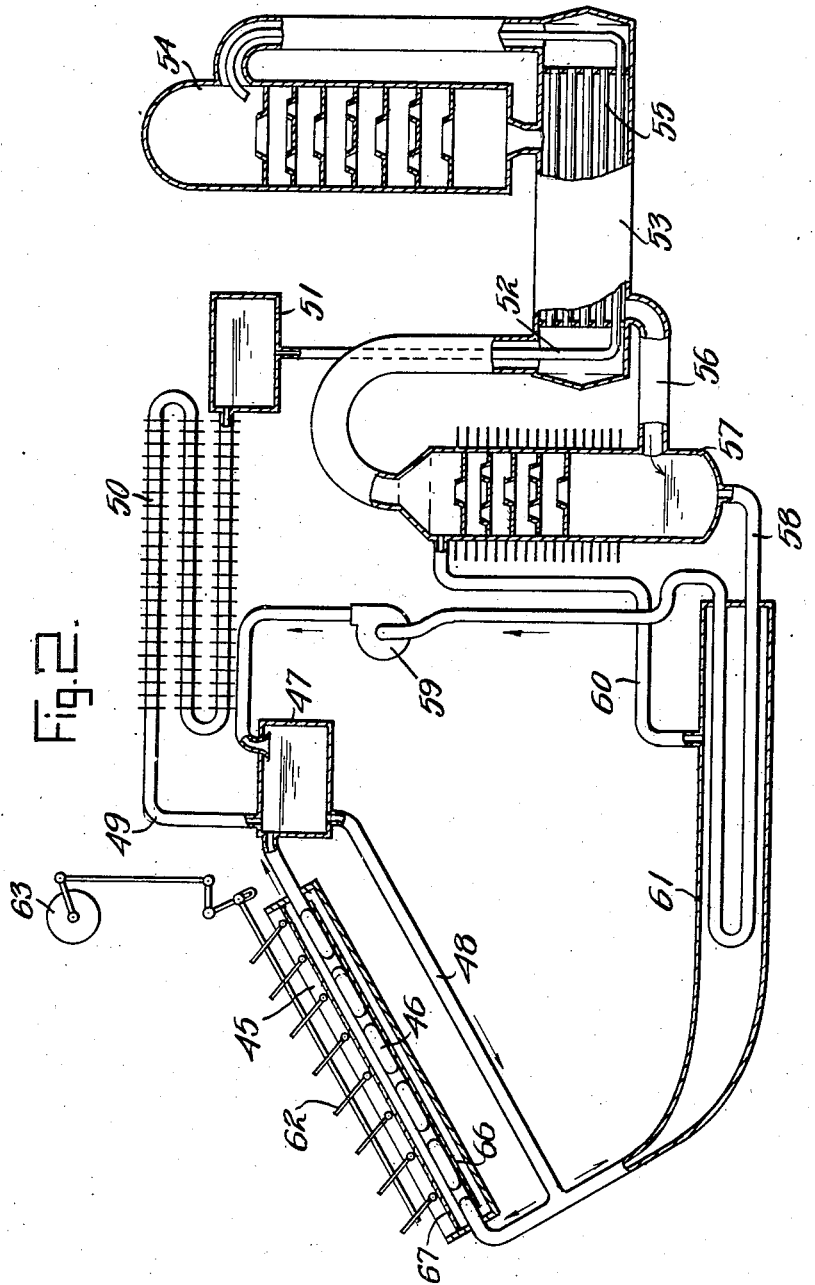

2,030,350

UNITED STATES PATENT OFFICE 2,030,350

SOLAR OPERATED REFRIGERATING SYSTEM

Albert T. Bremser, Westmont, N. J., assignor of fifty-two per cent to Carl G. Fisher, Miami Beach, Fla.

Application April 10, 1933, Serial No. 665,461

8 Claims. (Cl. 62—119.5)

My invention provides a system of cooling by utilizing the heat energy of the sun's rays. The invention therefore relates to a cooling or refrigerating system operated by solar heating means. The invention comprises a combination of some form of absorption type of cooling system with a solar heater.

The object of the invention therefore is to provide a cooling system which may be operated without mechanical heat and which may be operated without fuel cost and in sections having no available mechanical heat source other than the sun's rays.

A further object is to provide a cooling system which will respond automatically to changes in temperature to keep the temperature within desired limits.

Referring to the accompanying drawings, which are made a part hereof and on which similar reference characters indicate similar parts, Figure 1 is a view in elevation with parts shown in section of my cooling system, and Figure 2, a view in elevation of a modified form of cooling system adapted particularly for the cooling of rooms or compartments.

In the drawings numeral 10 indicates a solar heater which comprises an insulated box 11 having preferably a glass cover 12 and having coils 13 and 14 therein. These coils are made of metal having a high co-efficient of heat conductivity. The coils are mounted upon a sheet of metal 15 which likewise is of a high heat conductive material such as copper, aluminum or other suitable metals. Shutters 16 are pivotally mounted upon the box and are connected by an operating link 17 which in turn is connected to an arm 18. The purpose of the shutters is to control the amount of sun rays permitted to strike the coils within the box and thus control the temperature of the solar heater. The box is set at a suitable angle to the horizontal in order to afford a better absorption of heat throughout the day. Two sets of coils 13 and 14 are positioned within the box 10. The coil 13 communicates at its upper end with the upper portion of a container 20. This container is divided by a horizontal partition into upper and lower chambers 19 and 22. The lower end of the coil enters the chamber 19 just above the partition 21. One or more riser tubes 23 are positioned with their lower ends extending well down into the chamber 22 and the upper ends above the normal level $a$—$b$ of liquid in the chamber 19. The upper end of the coil 14 enters the lower chamber 22. The upper portion of the chamber 19 is connnected by an outlet tube 24 with a rectifier 25 of known construction. The lower section of the upper chamber 19 is connected by a tube 26 which communicates with a jacket 27 surrounding the lower portion of the coil 14. A second tube 28 passes from the jacket 27 to the upper portion of an absorber drum 29. The upper portion of the rectifier is connected to a condenser coil 30 which may be cooled in any suitable way, either by water or by air. The lower portion of the U-tube 65 which forms part of the rectifier 25 is connected by a pipe 31 which passes through a liquid cooler 32 and enters the evaporator 33. The evaporator is filled with hydrogen gas and operates in a well known manner. The lower portion of the coil 14 communicates with the lower portion of the absorber 29. The liquid cooler 32 consists of a drum having plates 34 and 35 in which are fixed tubes 36. The lower portion of the evaporator communicates through a pipe 37 with the space surrounding these tubes. The chambers formed at the ends of the partitions are connected by jackets 38 and 39 with the upper portion of the evaporator 33 and the upper portion of the absorber 29. The evaporator has baffle plates 40 positioned in staggered relation therein and the absorber has similar parts 41. The space surrounding the tubes 36 communicates through pipe 44 with the absorber 29. A riser tube 64 also connects the space about the tubes 30 with the space above the liquid in the U-tube 65.

Before starting operation the container 20 is filled with water and ammonia. This is a strong ammonia liquid. The lower chamber 22 of the container 20 is also partially filled with ammonia liquid. The evaporator 33 and the upper portion of the absorber 29 are filled with hydrogen gas. The shutters 16 are positioned at a suitable angle and are operated by lever 18 which is operably connected with a thermostat 68 which is actuated by a heat responsive device 43 of any suitable construction. Thermostat 43 may be positioned to respond to changes of temperature in the evaporator or the chamber surrounding it. The ammonia liquid in the coils 13 and 14 is heated by rays from the sun. It is well known that the sun's rays may be controlled so as to raise the temperature of water to and even above the boiling point. The heat imparted to the liquid in the coils 13 and 14 therefore will vaporize the ammonia and also will cause circulation of the liquid in these coils. The circulation of the liquid through the upper coil 13 will be from the low portion of the chamber 19 to its upper portion. The ammonia gas and steam will be driven off from the surface of the liquid in the chamber 19. This gas will pass up through the tube 24 into the rectifier 25. Some of the liquid in the rectifier will pass immediately into the rectifier U-tube 65 and the gas will pass over into the condenser 30 where it is liquefied and returns to the right hand side of the U-tube and down through the tube 31, thence through the liquid cooler 32, and into the evaporator 33. The evaporator is filled with hydrogen gas into which ammonia freely evaporates to produce a lower temperature in the medium surrounding the evaporator. The circulation through the coil 14 is from the bottom of the absorber tank 29 through the coil 14 into the chamber 22 in the lower portion of the container 20. As this coil is heated the ammonia therein will be driven off from the water and this gas will be trapped in the space below the partition 21 and the surface of the liquid in the chamber 22. When the pressure in the chamber 22 reaches a high enough point to balance the column of liquid in the tube 23 the liquid will be forced up through this tube into the chamber 19 until the level of the liquid in the chamber 22 reaches the bottom of the tube 23 after which gas in the chamber 22 will rush up through the tube 23 carrying with it the liquid in the tube. This portion of the apparatus operates not altogether unlike a coffee percolator. Weak ammonia liquid from the lower portion of the chamber 19 will pass down through the tube 26 and through the tube 28 into the upper portion of the absorber 29. Strong ammonia liquid from the lower portion of the absorber 29 will pass into the lower portion of the coils 14, the circulation being caused by heating of the coils in the solar heater. The ammonia gases in the evaporator together with the hydrogen gases into which the ammonia has evaporated will pass down through the tube 37 and through the tube 44 into the absorber 29, where the ammonia will be absorbed by the water in the absorber and the hydrogen gases will rise to the top of the absorber to return through the jackets 39, the tubes 36 and the jacket 38 into the evaporator again. The hydrogen and ammonia gases as they leave the evaporator have been greatly lowered in temperature and these serve to pre-cool the ammonia liquid as it passes through the pipe 31 through the liquid cooler 32. After starting, the operation is continuous so long as heat is applied to the coils 13 and 14. The thermostat 43 may be set to maintain the temperature at any desired point in the evaporator. When the temperature falls below a predetermined degree the shutters 16 will be closed to reduce the amount of coils exposed to the rays of the sun so that the device will operate automatically to maintain the temperature at the desired low level.

In the system shown in Figure 2 the heating chamber 45 contains only a single coil 46. This coil at its upper end communicates with the upper portion of a chamber 47 and the liquid returns from chamber 47 through return pipe 48. The coils 46 are mounted upon a metallic plate 66. The chamber is covered by a glass plate 67. When the ammonia in the coils 46 has been heated circulation is set up through the chamber 47. As the temperature of the ammonia is raised the ammonia gas will pass off and out through the tube 49. This ammonia vapor is liquefied by the cooler 50 and passes into a receiver 51. From this receiver liquid ammonia passes through the tube 52 and the liquid cooler 53 where it evaporates into the hydrogen filled evaporator 54. Hydrogen and ammonia gas return from the evaporator through the spaces about the tubes 55 and return through the tube 56 to the absorber 57. The lower portion of the absorber 57 is connected by a coil 55 which is connected with the upper portion of the chamber 47. A pump or other fluid impeller 59 may be positioned in the pipe 58 to force circulation from the absorber into the chamber 47. The upper portion of the absorber 57 is connected by a pipe 60 with a chamber 64 into which chamber the coil or pipe 58 extends. The absorber 57 may be cooled in any suitable way either by air or water as desired. Shutters 62 may be pivotally mounted on the heater 45 and operated by a thermostat 63 which may be positioned in the chambers or rooms to be cooled so that the amount of heat imparted to the ammonia liquid will be controlled in response to the temperature in the rooms which are cooled.

It will be obvious to those skilled in the art that various changes may be made in my device without departing from the spirit of the invention and therefore I do not limit myself to what is shown in the drawings and described in the specification, but only as indicated by the appended claims.

Having thus fully described my said invention, what I claim as new and desire to secure by Letters Patent, is:

1. In a cooling system of the kind described having an evaporator and absorber, a container having a horizontal partition wall therein separating the container into upper and lower chambers, a riser tube mounted in said partition and communicating with the said upper and lower chambers, a solar heater having a pair of coils positioned therein, the ends of the upper coil connecting with the lower and upper portions of the upper chamber in the said container, the upper end of the lower coil communicating with the lower chamber of the container, the opposite end of the said coil being connected to the lower side of the absorber of the refrigerating system, substantially as set forth.

2. In a cooling system of the kind described having an evaporator and absorber, a container having a horizontal partition wall therein separating the container into upper and lower chambers, a riser tube mounted in said partition and communicating with the said upper and lower chambers, a solar heater having a pair of coils positioned therein, the ends of the upper coil connecting with the lower and upper portions of the upper chamber in the said container, the upper end of the lower coil communicating with the lower chamber of the container, the opposite end of the said coil being connected to the lower side of the absorber of the refrigerating system, the lower end of said upper chamber being connected with the upper end of the said absorber, substantially as set forth.

3. A refrigerator of the absorber type comprising a vaporizer, a condenser, an evaporator and an absorber, the vaporizer comprising a solar operated boiler, a solution container, means for circulating solution from the container thru the boiler and back into the container and means for circulating solution from the absorber thru the boiler to the container and from the container to the absorber.

4. A refrigerating system of the absorber type comprising a vaporizer, a condenser, an evaporator and an absorber, the vaporizer comprising a boiler having a pair of coils positioned therein and having a rising gradient, a container, one set of said coils being connected with the container to cause circulation of solution from the container thru the boiler and back into the container, the other set of coils being connected with the absorber and with the container to cause circulation of solution from the absorber thru the boiler and back into the container, the said last named coils supplying a relatively strong solution to the container as well as serving to boil off vapor from the solution.

5. An absorber refrigerating system comprising a vaporizer, a condenser, an evaporator and an absorber, the vaporizer comprising a solar operated boiler and a liquid-vapor container, means for circulating a strong liquid from the absorber thru the boiler to the container and means for circulating a weaker liquid from the container thru the boiler back into the container.

6. An absorber refrigerating system comprising a vaporizer, a condenser, an evaporator, and an absorber, the vaporizer comprising a solar operated boiler, a vapor and liquid container, means for circulating strong liquid from the absorber thru the boiler into the container to enrich the liquid in the container and to vaporize some of the refrigerant in the liquid, means for circulating a weaker liquid from the container thru the boiler and back into the container and to vaporize some of the refrigerant in the liquid, the first named circulating means serving also to enrich the liquid circulated by the last named circulating means to replace the refrigerant evaporated therefrom.

7. An absorber refrigerating system comprising a vaporizer, a condenser, an evaporator and an absorber, the vaporizer comprising a solar operated boiler, a vapor and liquid container, a coil having its ends connected to the container, one at a greater elevation than the other, for circulating solution thru the boiler, a second coil connected to the absorber and to the container and passing thru the boiler for circulating a stronger solution thru the boiler, a plurality of shutters positioned on the boiler and movable to cut off a predetermined amount of the sun's rays on the boiler, and means controlled by the temperature in the evaporator for operating said shutters.

8. A refrigerating system of the absorber type comprising a generator, a condenser, an evaporator and an absorber, the generator comprising a solar heated boiler and a vapor-liquid filled container with a set of coils connecting the container and boiler to cause circulation of liquid from the container thru the boiler and back into the container to boil off vapor from the liquid, a second set of coils connecting the absorber with the container and passing thru the boiler for causing circulation of strong liquid thru the boiler and into the container and for boiling off vapor therefrom, means for utilizing the last named vapor for delivering strong liquid to the first named set of coils and means for returning weak liquid from the container to the absorber.

ALBERT T. BREMSER.